US009957643B2

(12) United States Patent
Simmelink et al.

(10) Patent No.: US 9,957,643 B2
(45) Date of Patent: May 1, 2018

(54) FIBERS OF UHMWPE AND A PROCESS FOR PRODUCING THEREOF

(71) Applicant: DSM IP Assets B.V., Heerlen (NL)

(72) Inventors: Joseph Arnold Paul Maria Simmelink, Dilsen-Stokkem (BE); Paulus Antonius Maria Steeman, Spaubeek (NL)

(73) Assignee: DSM IP ASSETS B.V., Heerlen (NL)

( * ) Notice: Subject to any disclaimer, the term of this patent is extended or adjusted under 35 U.S.C. 154(b) by 433 days.

(21) Appl. No.: 14/664,788

(22) Filed: Mar. 20, 2015

(65) Prior Publication Data

US 2015/0191851 A1    Jul. 9, 2015

Related U.S. Application Data

(62) Division of application No. 12/681,700, filed as application No. PCT/EP2008/008418 on Oct. 6, 2008, now Pat. No. 9,005,753.

(30) Foreign Application Priority Data

Oct. 5, 2007    (EP) .................................... 07019507

(51) Int. Cl.
*D01F 6/04*    (2006.01)
*D01D 5/04*    (2006.01)
(Continued)

(52) U.S. Cl.
CPC ............ *D01F 6/04* (2013.01); *B29C 47/0004* (2013.01); *C08F 110/02* (2013.01); *D01D 5/04* (2013.01);
(Continued)

(58) Field of Classification Search
CPC ..... D01F 6/04; C08F 110/02; B29X 47/0004; D01D 5/04; Y10T 428/2913; B29L 2031/731; B29K 2023/0683
See application file for complete search history.

(56) References Cited

U.S. PATENT DOCUMENTS

2010/0249831 A1    9/2010    Vlasblom et al.

FOREIGN PATENT DOCUMENTS

| JP | 59-130021 | 7/1984 |
|----|-----------|--------|
| JP | 1-162816  | 6/1989 |

(Continued)

OTHER PUBLICATIONS

ASTM D4440-01 Standard Test Method for Plastics: Dynamic Mechanical Properties: Melt Rheology, ASTM International, West Conshohocken, PA, 2001, https://doi.org/10.1520/D4440-01.*

(Continued)

*Primary Examiner* — Galen H Hauth
(74) *Attorney, Agent, or Firm* — Nixon & Vanderhye P.C.

(57) ABSTRACT

The invention relates to a process for producing gel-spun ultra high molecular weight polyethylene (UHMWPE) fibres having high tensile strengths and improved creep rates wherein the UHMWPE used in said process is characterized by a difference in the phase angle according to Formula 1

Figure 1:
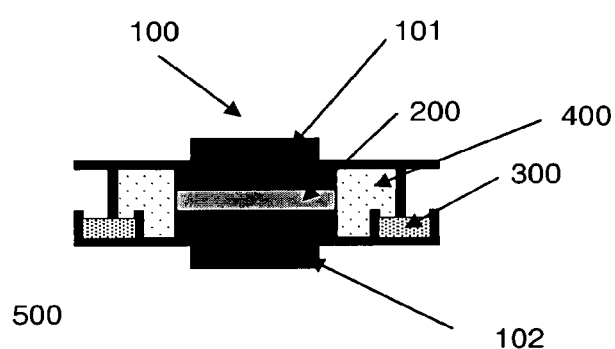

$$\Delta\delta = \delta_{0.001} - \delta_{100} \qquad (1)$$

of at most 42°,
wherein $\delta_{0.001}$ is the phase angle at an angular frequency of 0.001 rad/sec; and
$\delta_{100}$ is the phase angle at an angular frequency of 100 rad/sec as measured with a frequency sweep dynamic rheological technique at 150° C. on a 10% solution of UHMWPE in paraffin oil, provided that $\delta_{100}$ is at most 18°. The invention further relates to gel-spun UHMWPE fibres produced thereof. The gel-spun UHMWPE (Continued)

fibres of the invention have a tensile strength of at least 4 GPa, and a creep rate of at most $5\times10^{-7}$ sec$^{-1}$ as measured at 70° C. under a load of 600 MPa. The gel-spun UHMWPE fibres produced thereof are useful in a variety of applications, the invention relating in particular to ropes, medical devices, composite articles and ballistic-resistant articles containing said UHMWPE fibres.

6 Claims, 5 Drawing Sheets

(51) Int. Cl.
  *B29C 47/00* (2006.01)
  *C08F 110/02* (2006.01)
  *B29K 23/00* (2006.01)
  *B29L 31/00* (2006.01)
(52) U.S. Cl.
  CPC . *B29K 2023/0683* (2013.01); *B29L 2031/731* (2013.01); *Y10T 428/2913* (2015.01)

(56) References Cited

FOREIGN PATENT DOCUMENTS

| WO | 88/03184 | 5/1988 |
|---|---|---|
| WO | 03/087217 | 10/2003 |
| WO | WO 2005/066401 | 7/2005 |

OTHER PUBLICATIONS

International Search Report for PCT/EP2008/008419, dated May 6, 2009.
Written Opinion of the International Searching Authority for PCT/EP2008/8419, dated May 6, 2009.
Prevorsek, D.C., "Preparation, Structure, Properties and Applications of Gel-spun Ultrastrong Polyethylene Fibers", Trends in Polymer Science, vol. 3, No. 1, (Jan. 1, 1995), pp. 4-11.
Penning et al, "Influence of chemical crosslinking on the creep behavior of ultra-high molecular weight polyethylene fibers," Colloid and Polymer Science, vol. 272 No. 6, 1994, p. 664-676.
U.S. Appl. No. 12/68,694, filed Apr. 5, 2010.
Jacobs, Martinus J.N., "*Creep of gel-spun polyethylene fibres: Improvements by impregnation and crosslinking*", Eindhoven Technisch Universiteit, ISBN 90-386-2741-6 (1999).

\* cited by examiner

FIBERS OF UHMWPE AND A PROCESS FOR PRODUCING THEREOF

This application is a divisional of commonly owned copending U.S. application Ser. No. 12/681,700, filed Jul. 16, 2010 (now U.S. Pat. No. 9,005,753), which is the national phase application under 35 USC § 371 of PCT/EP2008/008418, filed Oct. 6, 2008, and claims the benefit of priority of EP 07019507.8, filed Oct. 5, 2007, the entire contents of which are hereby incorporated by reference.

The invention relates to a process for producing gel-spun ultra high molecular weight polyethylene (UHMWPE) fibres having high tensile strengths and improved creep rates and to gel-spun UHMWPE fibres produced thereof. The gel-spun UHMWPE fibres produced thereof are useful in a variety of applications, the invention relates in particular to ropes, medical devices, composite articles and ballistic-resistant articles containing said UHMWPE fibres.

A process for producing gel-spun UHMWPE fibres having high tenacities and improved creep resistance is known for example from EP1,699,954 the process comprising the steps of:
a) Preparing an UHMWPE solution in a solvent, the UHMWPE having an intrinsic viscosity in decalin at 135° C. of at least 5 dl/g;
b) Spinning the solution of step a) through a spinneret containing multiple spinholes into an air gap to form fluid filaments;
c) Cooling the fluid filaments to form solvent-containing gel filaments; and
d) Removing at least partly the solvent from the gel filaments to form solid filaments before and/or during drawing the solid filaments.

The obtained UHMWPE fibres had creep rates as low as $1 \times 10^{-6}$ sec$^{-1}$ as measured at 70° C. under a load of 600 MPa and tensile strengths as high as 4.1 GPa.

It is also known that a lowering of the creep rates of UHMWPE fibres may be achieved with a gel-spinning process wherein a highly branched UHMWPE is used, i.e. an UHMWPE having branches longer than a methyl branch, as for example ethyl, propyl and the like, or having a high amount of said branches or a combination thereof. However, said highly branched polyethylenes impair the drawing properties of the spun UHMWPE fibres and therefore, fibres having inferior tensile properties are produced.

On the other hand, it is known that by using less branched UHMWPE, i.e. polyethylenes having a more linear configuration meaning a low amount of branches or short branches, e.g. methyl branches, fibres with improved tensile properties can be produced. However, these fibres show poor creep properties. Therefore, because the creep and tensile properties are not concurrent properties, it is not by any means trivial for anyone skilled in the art to obtain UHMWPE fibers with a low creep rate as well as high tensile strength.

The object of the invention is therefore to fulfil the need for UHMWPE fibres having a combination of high tensile strength and low creep rate, combination that is not met by any of the existent UHMWPE fibres and for a process for the preparation thereof.

The object of the invention was achieved with a process of producing gel-spun UHMWPE fibres characterized in that the UHMWPE is characterized by a difference in the phase angle according to Formula 1

$$\Delta\delta = \delta_{0.001} - \delta_{100} \qquad (1)$$

of at most 42°,
wherein $\delta_{0.001}$ is the phase angle at an angular frequency of 0.001 rad/sec and $\delta_{100}$ is the phase angle at an angular frequency of 100 rad/sec as measured with a frequency sweep dynamic rheological technique at 150° C. on a 10% solution of UHMWPE in paraffin oil, provided that $\delta_{100}$ is at most 18°.

Surprisingly, the inventors found that by using an UHMWPE having a $\Delta\delta = \delta_{0.001} - \delta_{100}$ difference as defined by claim 1 in the gel-spinning process of the invention, novel UHMWPE fibres were obtained having a combination of tensile strengths and creep rates which to inventors' knowledge was never achieved hitherto.

It was also surprisingly observed that it was possible to apply a higher overall draw ratio ($DR_{overall}$) to the spun fibres in the process of the invention without the occurrence of breakages as compared to the $DR_{overall}$ applied to fibres made of known UHMWPE or previously reported in the state of the art. By $DR_{overall}$ is herein understood the multiplication of the draw ratios applied to the fibres at different stages in the process of the invention, i.e. the draw ratio applied to fluid filament ($DR_{fluid}$), the draw ratio applied to the solvent-containing gel filament ($DR_{gel}$) and the draw ratio applied to the solid fibres ($DR_{solid}$). Accordingly, $DR_{overall} = DR_{fluid} \times DR_{gel} \times DR_{solid}$.

Preferably, the $DR_{overall}$ applied to the UHMWPE fibres of the invention, is at least 5000, more preferably at least 8000, even more preferably at least 12.000, yet even more preferably at least 15.000, yet even more preferably at least 20.000, yet even more preferably at least 25.000, yet even more preferably at least 30.000, most preferably at least 35.000.

The advantage of applying such high $DR_{overall}$ in the process of the invention, is that unique UHMWPE fibres were obtained having even further improved creep rates and/or tensile strengths.

A further advantage of the process of the invention is that a higher drawing rate can be used to draw the UHMWPE fibres of the invention, improving the production output and decreasing the production time, therefore, making the process of the invention more attractive economically. By drawing rate is herein understood the drawing ratio divided by the time in seconds needed to achieve said drawing ratio.

Preferably, the $\Delta\delta 0$ difference characterizing the UHMWPE used in the process of the invention is at most 40°, more preferably at most 38°, even more preferably at most 36°, most preferably at most 35° provided that $\delta_{100}$ is at most 18°. Preferably, said $\Delta\delta$ difference is at least 5°, more preferably at least 15°, most preferably at least 25°. Preferably, said $\Delta\delta$ difference has the above mentioned values provided that $\delta_{100}$ is at most 16°, more preferably at most 14°, even more preferably at most 12°, most preferably at most 10°. Preferably, $\delta_{100}$ is at least 2°, more preferably at least 4°, most preferably at least 6°.

The UHMWPE used in the process of the invention has an intrinsic viscosity (IV) as measured on solution in decalin at 135° C., of at least 5 dl/g, preferably at least 10 dl/g, more preferably at least 15 dl/g, most preferably at least 21 dl/g. Preferably, the IV is at most 40 dl/g, more preferably at most 30 dl/g, even more preferably at most 25 dl/g.

In a preferred embodiment, said UHMWPE comprises per thousand carbon atoms between 0.1 and 1.3, even more preferably between 0.2 and 1.2, yet even more preferably between 0.25 and 0.9, yet even more preferably between 0.3 and 0.6, most preferably between 0.3 and 0.5 methyl groups corresponding to ethyl side groups. More preferably, said UHMWPE comprises per thousand carbon atoms between 0.08 and 0.7, even more preferably between 0.08 and 0.5, yet even more preferably between 0.09 and 0.4, yet even more preferably between 0.1 and 0.3, yet even more preferably between 0.15 and 0.3, most preferably between 0.2 and 0.3 of methyl end groups. By methyl end groups is herein understood methyl groups corresponding to ends of the UHMWPE chains and to ends of long chain branches (LCB) of the UHMWPE chains. By LCB are herein understood branches longer than an ethyl group, e.g. propyl, butyl, hexyl and longer branches.

Preferably, the total amount of methyl groups per thousand carbon atoms obtained by adding the amount per thousand carbon atoms of methyl groups corresponding to ethyl side groups and the amount per thousand carbon atoms of methyl end groups is between 0.3 and 2, more preferably the total is between 0.4 and 1.7, even more preferably between 0.45 and 1.3, yet even more preferably between 0.5 and 0.9, most preferably between 0.5 and 0.7.

It was surprisingly found that by using the UHMWPE of this preferred embodiment in the process of the invention, the combination of tensile strength and creep rate and in particular the creep rate of the UHMWPE fibers of the invention is further improved.

The UHMWPE solution is preferably prepared with a concentration of at least 3 mass-%, more preferably of at least 5 mass-%, even more preferably at least 8 mass-%, most preferably at least 10 mass-%. The UHMWPE solution, preferably has a concentration of at most 30 mass-%, more preferably at most 25 mass-%, even more preferably at most 20 mass-%, most preferably at most 15 mass-%. To improve processability, a lower concentration is preferred the higher the molar mass of the polyethylene is. Preferably, the concentration is between 3 and 15 mass-% for UHMWPE with IV in the range 15-25 dl/g.

To prepare the UHMWPE solution, any of the known solvents suitable for gel spinning the UHMWPE may be used. Suitable examples of solvents include aliphatic and alicyclic hydrocarbons, e.g. octane, nonane, decane and paraffins, including isomers thereof; petroleum fractions; mineral oil; kerosene; aromatic hydrocarbons, e.g. toluene, xylene, and naphthalene, including hydrogenated derivatives thereof, e.g. decalin and tetralin; halogenated hydrocarbons, e.g. monochlorobenzene; and cycloalkanes or cycloalkenes, e.g. careen, fluorine, camphene, menthane, dipentene, naphthalene, acenaphthalene, methylcyclopentadien, tricyclodecane, 1,2,4,5-tetramethyl-1,4-cyclohexadiene, fluorenone, naphtindane, tetramethyl-p-benzodiquinone, ethylfuorene, fluoranthene and naphthenone. Also combinations of the above-enumerated solvents may be used for gel spinning of UHMWPE, the combination of solvents being also referred to for simplicity as solvent. In a preferred embodiment, the solvent of choice is not volatile at room temperature, e.g. paraffin oil. It was also found that the process of the invention is especially advantageous for relatively volatile solvents at room temperature, as for example decalin, tetralin and kerosene grades. In the most preferred embodiment the solvent of choice is decalin.

According to the invention, the UHMWPE solution is formed into fluid filaments by spinning said solution through a spinneret containing multiple spinholes. As used herein, the term "fluid filament" refers to a fluid-like filament containing a solution of UHMWPE in the solvent used to prepare said UHMWPE solution, said fluid filament being obtained by extruding the UHMWPE solution through the spinneret, the concentration of the UHMWPE in the extruded fluid filaments being the same or about the same with the concentration of the UHMWPE solution before extrusion. By spinneret containing multiple spinholes is herein understood a spinneret containing preferably at least 10 spinholes, more preferably at least 50, even more preferably at least 100, yet even more preferably at least 300, most preferably at least 500.

Preferably the spinneret contains at most 5000, more preferably 3000, most preferably 1000 spinholes.

Preferably, the spinning temperature is between 150° C. and 250° C., more preferably it is chosen below the boiling point of the spinning solvent. If for example decaline is used as spinning solvent the spinning temperature is preferably at most 190° C., more preferably at most 180° C., most preferably at most 170° C. and preferably at least 115° C., more preferably at least 120° C., most preferably at least 125° C. In case of paraffin, the spinning temperature is preferably below 220° C., more preferably between 130° C. and 195° C.

In a preferred embodiment, each spinhole of the spinneret has a geometry comprising at least one contraction zone. By contraction zone is herein understood a zone with a gradual decrease in diameter with a cone angle in the range 8-75° from a diameter $D_0$ to $D_n$ such that a draw ratio $DR_{sp}$ is achieved in the spinhole. Preferably, the spinhole further comprises at least one zone of constant diameter with a length/diameter ratio $L_n/D_n$ of at most 50 downstream of the contraction zone. More preferably $L_n/D_n$ is at most 40, even more preferably at most 25, most preferably at most 10 and preferably at least 1, more preferably at least 3, most preferably at least 5. $L_n$ is the length of the zone with constant diameter $D_n$. Preferably, the ratio $D_0/D_n$ is at least 2, more preferably at least 5, even more preferably at least 10, yet even more preferably at least 15, most preferably at least 20. Preferably, the cone angle is at least 10°, more preferably at least 12°, even more preferably at least 15°. Preferably, the cone angle is at most 60°, more preferably at most 50°, even more preferably at most 45°.

The diameter of the spinhole is herein meant to be the effective diameter, i.e. for non-circular or irregularly shaped spinholes, the largest distance between the outer boundaries of the spinhole.

With cone angle is herein meant the maximum angle between the tangents to opposite wall surfaces in the contraction zone of the spinhole. For example, for a conical or tapered contraction zone, the cone angle between the tangents is constant, whereas for a so-called trumpet type of contraction zone the cone angle between the tangents will decrease with decreasing diameter. For a wineglass type of contraction zone the angle between the tangents passes through a maximum value.

The draw ratio in the spinholes $DR_{sp}$ is represented by the ratio of the solution flow speed at the initial cross-section and at the final cross-section of the contraction zone, which is equivalent to the ratio of the respective cross-sectional areas. In case of contraction zone having the shape of a frustum of a circular cone, $DR_{sp}$ is equal to the ratio between the square of the initial and final diameters, i.e. $=(D_0/D_n)^2$.

Preferably, $D_0$ and $D_n$ are chosen to yield a $DR_{sp}$ of at least 5, more preferably at least 10, even more preferably at least 15, yet even more preferably at least 20, yet even more preferably at least 25, most preferably at least 30.

The fluid filaments formed by spinning the UHMWPE solution through the spinneret are extruded into an air gap, and then into a cooling zone from where they are picked-up on a first driven roller. Preferably, the fluid filaments are stretched in the air gap with a drawing ratio $DR_{ag}$ of at least 15 by choosing an angular speed of the first driven roller such that said roller's surface velocity exceeds the flow rate of the UHMWPE solution issued form the spinneret. The draw ratio in the air gap, $DR_{ag}$, is more preferably at least 20, even more preferably at least 25, yet even more preferably at least 30, yet even more preferably at least 35, yet even more preferably at least 40, yet even more preferably at least 50, most preferably at least 60.

In a preferred embodiment, the $DR_{sp}$ and $DR_{ag}$ are chosen to yield a total draw ratio of the fluid UHMWPE filaments, $DR_{fluid}=DR_{sp}\times DR_{ag}$ of at least 150, more preferably at least 250, even more preferably at least 300, yet even more preferably at least 350, yet even more preferably at least 400, yet even more preferably at least 500, yet even more preferably at least 600, yet even more preferably at least 700, most preferably at least 800. It was surprisingly found that it was possible to subject the fluid filaments comprising the UHMWPE of the invention to a higher $DR_{fluid}$ than it was possible heretofore, while keeping the occurrence of breakages at the same level.

Correspondingly, when the fluid UHMWPE filaments were subjected to a $DR_{fluid}$ equally as large with those previously applied in the state of the art, the breakages occurring to fluid filaments were reduced.

The length of the air gap is preferably at least 1 mm, more preferably at least 3 mm, even more preferably at least 5 mm, yet even more preferably at least 10 mm, yet even more preferably at least 15 mm, yet even more preferably at least 25 mm, yet even more preferably at least 35 mm, yet even more preferably at least 25 mm, yet even more preferably at least 45 mm, most preferably at least 55 mm. The length of the air gap is preferably at most 200 mm, more preferably at most 175 mm, even more preferably at most 150 mm, yet even more preferably at most 125 mm, yet even more preferably at most 105 mm, yet even more preferably at most 95 mm, most preferably at most 75 mm.

Cooling, also known as quenching, the fluid filaments after exiting the air-gap to form solvent-containing gel filaments, may be performed in a gas flow and/or in a liquid cooling bath. Preferably, the cooling bath contains a cooling liquid that is a non-solvent for UHMWPE and more preferably a cooling liquid that is not miscible with the solvent used for preparing the UHMWPE solution. Preferably, the cooling liquid flows substantially perpendicular to the filaments at least at the location where the fluid filaments enter the cooling bath, the advantage thereof being that the drawing conditions can be better defined and controlled.

By air-gap is meant the length traveled by the fluid filaments before the fluid filaments are converted into solvent-containing gel filaments if gas cooling is applied, or the distance between the face of the spinneret and the surface of the cooling liquid in the liquid cooling bath. Although called air-gap, the atmosphere can be different than air; e.g. as a result of a flow of an inert gas like nitrogen or argon, or as a result of solvent evaporating from filaments or a combination thereof.

As used herein, the term "gel filament" refers to a filament which upon cooling develops a continuous UHMWPE network swollen with the spinning solvent. An indication of the conversion of the fluid filament into the gel filament and the formation of the continuous UHMWPE network may be the change in filament's transparency upon cooling from a translucent UHMWPE filament to a substantially opaque filament, i.e. the gel filament.

Preferably, the temperature to which the fluid filaments are cooled is at most 100° C., more preferably at most 80° C., most preferably at most 60° C. Preferably, the temperature to which the fluid filaments are cooled is at least 1° C., more preferably at least 5° C., even more preferably at least 10° C., most preferably at least 15° C.

In a preferred embodiment the solvent-containing gel filaments are drawn in at least one drawing step with a draw ratio $DR_{gel}$ of at least 1.05, more preferably at least 1.5, even more preferably at least 3, yet even more preferably at least 6, most preferably at least 10. The drawing temperature of the gel filaments is preferably between 10° C. and 140° C., more preferably between 30° C. and 130° C., even more preferably between 50° C. and 130° C., yet even more preferably between 80° C. and 130° C., most preferably between 100° C. and 120° C.

Subsequently to forming the gel filaments, said gel filaments are subjected to a solvent removal step wherein the spinning solvent is at least partly removed from the gel filaments to form solid filaments. The amount of residual spinning solvent, hereafter residual solvent, left in the solid filaments after the extraction step may vary within large limits, preferably the residual solvent being in a mass percent of at most 15% of the initial amount of solvent in the UHMWPE solution, more preferably in a mass percent of at most 10%, most preferably in a mass percent of at most 5%.

The solvent removal process may be performed by known methods, for example by evaporation when a relatively volatile spinning solvent, e.g. decaline, is used to prepare the UHMWPE solution or by using an extraction liquid, e.g. when paraffin is used, or by a combination of both methods. Suitable extraction liquids are liquids that do not cause significant changes in the UHMWPE network structure of the UHMWPE gel fibres, for example ethanol, ether, acetone, cyclohexanone, 2-methylpentanone, n-hexane, dichloromethane, trichlorotrifluoroethane, diethyl ether and dioxane or a mixture thereof. Preferably, the extraction liquid is chosen such that the spinning solvent can be separated from the extraction liquid for recycling.

The process according to the invention further comprises drawing the solid filaments during and/or after said removal of the solvent. Preferably, the drawing of the solid filaments is performed in at least one drawing step with a draw ratio $DR_{solid}$ of preferably at least 4. More preferably, $DR_{solid}$ is at least 7, even more preferably at least 10, yet even more preferably at least 15, yet even more preferably at least 20, yet even more preferably at least 30, most preferably at least 40. More preferably, the drawing of solid filaments is performed in at least two steps, even more preferably in at least three steps. Preferably, each drawing step is carried out at a different temperature that is preferably chosen to achieve the desired drawing ratio without the occurrence of filament breakage. If the drawing of solid filaments is performed in more than one step, $DR_{solid}$ is calculated by multiplying the draw ratios achieved for each individual solid drawing step.

More preferably, each solid drawing step is carried out by drawing the solid filaments while passing them continuously over a length of at least 10 meters through a drawing oven comprising driving rolls, such that the residence time in the oven is at most 10 minutes. Drawing in the oven can be easily carried out by the skilled person by adjusting the speeds of the driving rolls supporting the filaments. Preferably, the solid filaments are passed in the oven over a length of at least 50 meters, more preferably at least 100 meters, most preferably at least 200 meters. The residence time of the solid filaments in the oven is preferably at most 5 minutes, more preferably at most 3.5 minutes, even more preferably at most 2.5 minutes, yet even more preferably at most 2 minutes, yet even more preferably at most 1.5 minutes, most preferably at most 1 minute. The temperature in said oven may also have an increasing profile preferably between 120 and 155° C.

By residence time is herein understood the time spent by a cross-section of the solid filament in the oven from the moment it enters the oven until it exits it. It was surprisingly found that a shorter residence time was needed to achieve the same drawing ratio for the UHMWPE filaments in the process of the invention than it was possible before. Therefore, the efficiency of the process of the invention was improved in comparison with the efficiency of known processes for producing polyethylene fibres.

In a preferred embodiment, at least one drawing step is carried out at a temperature having an increasing profile between about 120 and about 155° C. Optionally, the process of the invention may also comprise a step of removing the residual spinning solvent from the UHMWPE fibres of the invention, preferably, said step being subsequent to the solid stretching step. In a preferred embodiment, the residual spinning solvent left in the UHMWPE fibre of the invention is removed by placing said fibre in a vacuumed oven at a temperature of preferably at most 148° C., more preferably of at most 145° C., most preferably of at most 135° C. Preferably, the oven is kept at a temperature of at least 50° C., more preferably at least 70° C., most preferably at least 90° C. More preferably, the removal of the residual spinning solvent is carried out while keeping the fiber taut, i.e. the fiber is prevented from slackening.

Preferably, the UHMWPE fibre of the invention at the end of the solvent removal step comprises spinning solvent in an amount of below 800 ppm. More preferably said amount of the spinning solvent is below 600 ppm, even more preferably below 300 ppm, most preferably below 100 ppm.

The invention further relates to a gel-spun UHMWPE fibre having a tensile strength of at least 4 GPa and a creep rate as measured at 70° C. under a load of 600 MPa of at most $5 \times 10^{-7}$ sec$^{-1}$. More preferably, the creep rate of the UHMWPE fibre according to the invention is at most $3 \times 10^{-7}$ sec$^{-1}$, even more preferably at most $1.5 \times 10^{-7}$ sec$^{-1}$, yet even more preferably at most $0.8 \times 10^{-7}$ sec$^{-1}$, yet even more preferably at most $0.2 \times 10^{-7}$ sec$^{-1}$, most preferably at most $0.09 \times 10^{-7}$ sec$^{-1}$. The tensile strength of the UHMWPE fibre is preferably at least 4.5 GPa, more preferably at least 5 GPa, even more preferably at least 5.5 GPa, most preferably at least 6 GPa.

The UHMWPE fibre is for example obtainable by the above gel-spinning process. Preferably the UHMWPE fibre is obtained by the above method, but other methods of manufacturing may also be feasible.

Gel-spun UHMWPE fibres with high tenacities and improved creep resistance are known for example from EP 1,699,954, EP 0,205,960 B1, EP 0,269,151, JP 5-70274, U.S. Pat. Nos. 5,115,067 and 5,246,657. A summary of the fibres' tensile strength and creep rate values as reported by the above cited references and the conditions defined in said references under which the creep rates were measured are given in Table 1. The referred table further includes the creep rates and tensile strengths of the UHMWPE fibres of the invention (Example 1) determined in accordance with the measurement techniques and under the same conditions of temperature and load as described in the cited references. As it can be seen from the referred table, none of the fibres of the cited references possesses the combination of high strength and low creep, of the UHMWPE fibres of the invention.

Preferably, the UHMWPE fibres of the invention have a modulus of at least 100 GPa, more preferably of at least 130 GPa, even more preferably of at least 160 GPa, yet even more preferably of at least 190 GPa, most preferably of at least 220 GPa. Without being bound by any theory, the inventors attributed the increase in modulus to the permissible higher $DR_{overall}$ for the UHMWPE fibres of the invention.

The invention also relates to a yarn containing the UHMWPE fibers of the invention.

It was observed that after processing the UHMWPE polymer used in the process of the invention into an UHMWPE fiber, the $\Delta\delta$ difference for the UHMWPE contained in the UHMWPE fiber increased. Although this effect could not have been explained, it was surprisingly found that this effect contributed to achieving a fiber with improved creep rate and tensile strength properties.

In a preferred embodiment, the UHMWPE fibers of the invention contain an UHMWPE having a $\Delta\delta$ difference of at most 65°, more preferably at most 60°, even more preferably at most 55°, yet even more preferably at most 50°, yet even more preferably at most 45°, yet even more preferably at most 42°, yet even more preferably at most 40°, yet even more preferably at most 36°, most preferably at most 35° provided that $\delta_{100}$ is at most 18°. Preferably, said $\Delta\delta$ difference is at least 5°, more preferably at least 15°, most preferably at least 25°. Preferably, said $\Delta\delta$ difference has the above mentioned values provided that $\delta_{100}$ is at most 16°, more preferably at most 14°, even more preferably at most 12°, most preferably at most 10°. Preferably, $\delta_{100}$ is at least 2°, more preferably at least 4°, most preferably at least 6°.

By fibre is herein understood an elongated body, i.e. a body having a length much greater than its transverse dimensions. The fibre as used herein includes a plurality of filaments having regular or irregular cross-sections and having continuous and/or discontinuous lengths. Within the context of the invention, a yarn is understood to be an elongated body comprising continuous and/or discontinuous fibres. The yarn according to the invention may be a twisted or a braided yarn.

The UHMWPE fibres of the invention have properties which make them an interesting material for use in ropes, cordages and the like, preferably ropes designed for heavy-duty operations as for example towing, marine and offshore operations. Heavy duty operations may further include, but not restricted to, anchor handling, mooring of heavy vessels, mooring of drilling rigs and production platforms and the like. Most preferably, the UHMWPE fibres of the invention are used in applications where the UHMWPE fibres are experience static tension. By static tension is herein meant that the fibre in application always or most of the time is under tension irrespective if the tension is at constant level (for example a weight hanging freely in a rope comprising the fibre) or varying level (for example if exposed to thermal expansion or water wave motion). Examples of highly preferred used with static tension is for example many medical applications (for example cables and sutures), mooring ropes, and tension reinforcement elements, as the reduced creep of the present fibres leads to highly improved system performance is these and similar applications.

Therefore, the invention relates to ropes containing the UHMWPE fibres of the invention. Preferably, at least 50 mass-%, more preferably at least 75 mass-%, even more preferably at least 90 mass-% from the total mass of the fibres used to manufacture the rope consists of the UHMWPE fibres according to the invention. Most preferably the rope consists of the UHMWPE fibres of the invention.

The remaining mass percentage of the fibres in the rope according to the invention, may contain fibres or combination of fibers made of other materials suitable for making fibres as for example metal, glass, carbon, nylon, polyester, aramid, other types of polyolefin and the like.

The invention further relates to composite articles containing the UHMWPE fibres according to the invention.

In a preferred embodiment, the composite article contains at least one mono-layer comprising the UHMWPE fibres of the invention. The term mono-layer refers to a layer of fibers i.e. fibers in one plane.

In a further preferred embodiment, the mono-layer is a unidirectional mono-layer. The term unidirectional mono-layer refers to a layer of unidirectionally oriented fibers, i.e. fibers in one plane that are essentially oriented in parallel.

In a yet further preferred embodiment, the composite article is multi-layered composite article, containing a plurality of unidirectional mono-layers the direction of the fibres in each mono-layer preferably being rotated with a certain angle with respect to the direction of the fibres in an adjacent mono-layer. Preferably, the angle is at least 30°, more preferably at least 45°, even more preferably at least 75°, most preferably the angle is about 90°.

A mono-layer may further comprise a binder material, to hold the UHMWPE fibres together. The binder material can be applied by various techniques; for example as a film, as a transverse bonding strip or fibres (transverse with respect to the uni-directional fibers), or by impregnating and/or embedding the fibers with a matrix, e.g. with a solution or dispersion of matrix material in a liquid. The amount of binder material is preferably less than 30 mass-% based on the mass of the layer, more preferably less than 20, most preferably less than 15 mass-%. The mono-layer may further comprise small amounts of auxiliary components, and may comprise other fibres made of materials suitable for making fibres such as the ones enumerated hereinabove. Preferably the reinforcing fibres in the mono-layers consist of the UHMWPE fibres of the invention.

Multi-layered composite articles proved very useful in ballistic applications, e.g. body armor, helmets, hard and flexible shield panels, panels for vehicle armouring and the like. Therefore, the invention also relates to ballistic-resistant articles as the ones enumerated hereinabove containing the UHMWPE fibres of the invention.

The UHMWPE fibres of the invention having a low amount of residual solvent are also suitable for use in medical devices, e.g. sutures, medical cables, implants, surgical repair products and the like.

The invention therefore further relates to a medical device, in particular to a surgical repair product and more in particular to a suture and to a medical cable comprising the UHMWPE fibres of the invention.

The advantage of the suture and the medical cable according to the invention is that due to their excellent tensile properties and further due to their low creep rates, these products showed a good retention of their mechanical properties inside the human body.

The number and the thickness of the filaments in the UHMWPE fibre according to the invention can vary extensively, depending on the application in which the fibres are to be used. For example, in case of heavy-duty ropes for use in marine or offshore operations preferably fibres having at least 1500 dtex, more preferably of at least 2000 dtex, most preferably of at least 2500 dtex are used. When the fibres are used in medical devices, preferably their titer is at most 1500 dtex, more preferably at most 1000 dtex, most preferably at most 500 dtex.

It was also observed that the UHMWPE fibres of the invention showing the above mentioned unique combination of mechanical properties are suitable for use in other applications like for example, fishing lines and fishing nets, ground nets, cargo nets and curtains, kite lines, dental floss, tennis racquet strings, canvas (e.g. tent canvas), nonwoven cloths and other types of fabrics, webbings, battery separators, capacitors, pressure vessels, hoses, automotive equipment, power transmission belts, building construction materials, cut and stab resistant and incision resistant articles, protective gloves, composite sports equipment such as skis, helmets, kayaks, canoes, bicycles and boat hulls and spars, speaker cones, high performance electrical insulation, radomes, and the like. Therefore, the invention also relates to the applications enumerated above containing the UHMWPE fibers of the invention.

The invention also relates to the use of an UHMWPE as that used in the process of the invention in a spinning process to produce UHMWPE fibers. Such UHMWPE is characterized by a difference in the phase angle according to Formula 1

$$\Delta\delta = \delta_{0.001} - \delta_{100} \qquad (1)$$

of at most 42°, wherein $\delta_{0.001}$ is the phase angle at an angular frequency of 0.001 rad/sec; and $\delta_{100}$ is the phase angle at an angular frequency of 100 rad/sec as measured with a frequency sweep dynamic rheological technique at 150° C. on a 10% solution of UHMWPE in paraffin oil, provided that $\delta_{100}$ is at most 18°, as well as embodiments and preferred sub ranges of the UHMWPE as described above. In one embodiment, the spinning process is a melt spinning process, wherein the UHMWPE fibers are spun from a melt of the UHMWPE or a gel spinning process as described above. More preferably, the spinning process is a gel-spinning process wherein the UHMWPE fibers are spun from a solution of the UHMWPE in a solvent suitable to dissolve the UHMWPE. Most preferably, the gel spinning process is the process of the invention.

Hereinafter the figures are explained:

FIG. 1: Shows a cross section of the rheometer's plate system (100) provided with liquid-lock used for frequency sweep dynamic rheological measurements. The geometry of the upper (101) and lower (102) plates ensures that the environment (500) is not in direct contact with the disk sample (200) positioned between the plates. The paraffin bath (300) seals the disk sample from the environment, also ensuring a saturated atmosphere (400) with the paraffin's vapors.

Figure 2:
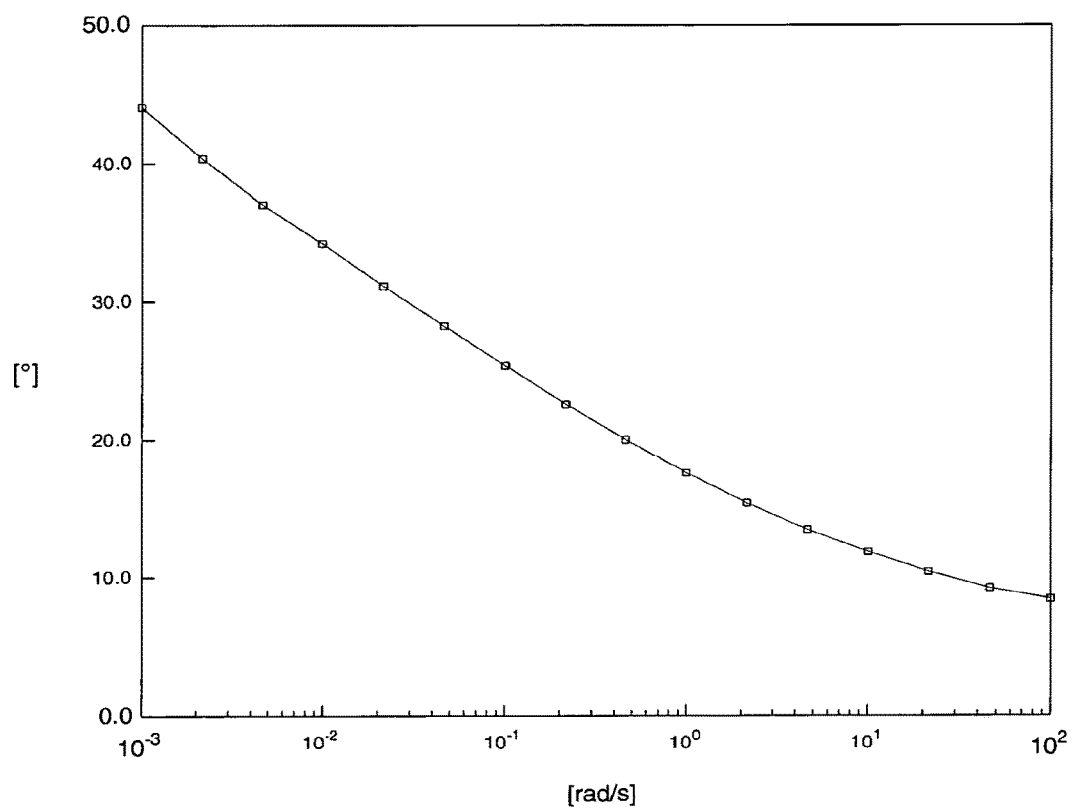

FIG. 2: Shows the variation of the phase angle δ [°] characteristic to UHMWPE grade GUR 4170 (sold by Ticona) within the angular frequency ω [rad/s] range between 0.001 rad/s and 100 rad/s.

Figure 3:
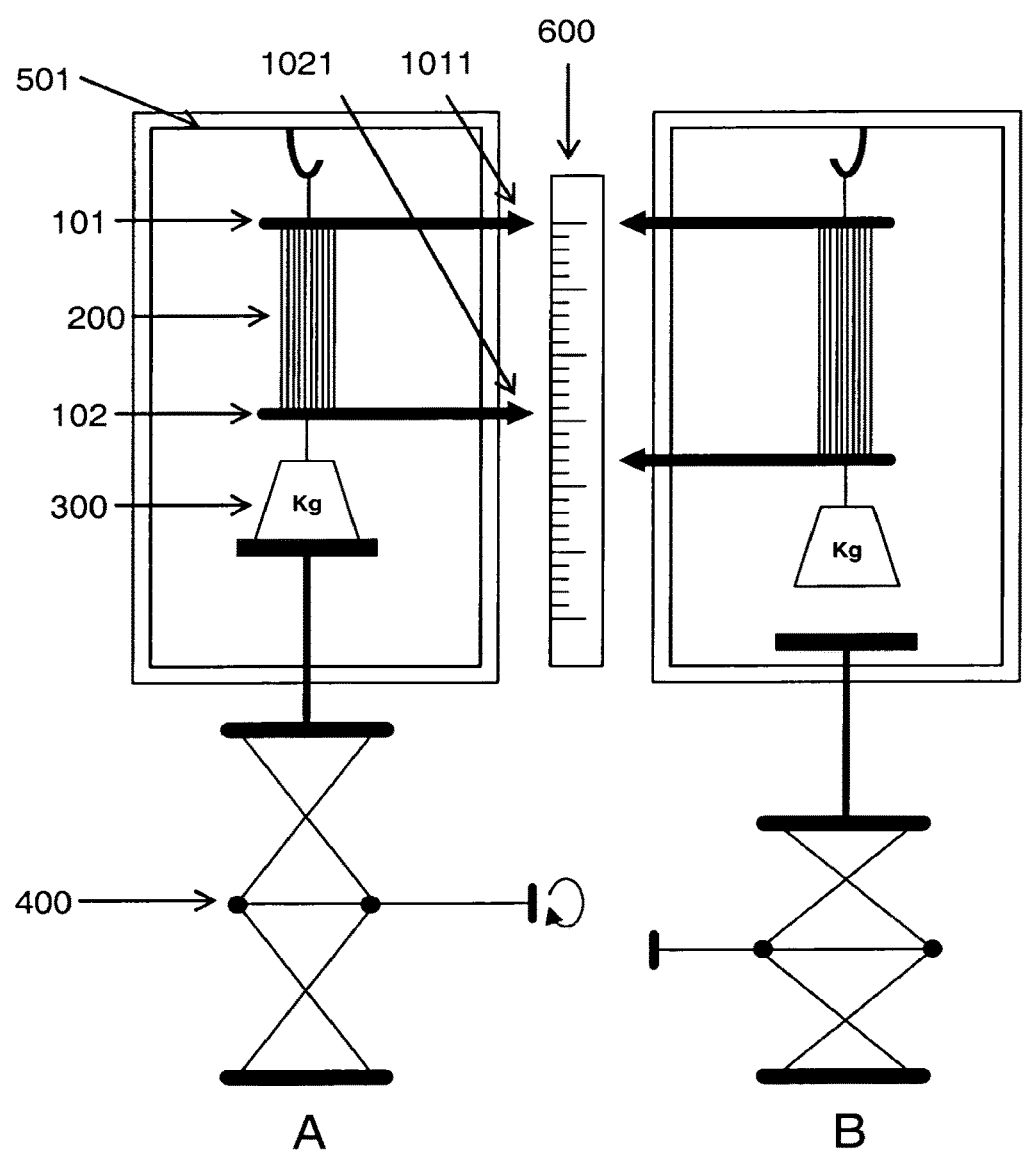

FIG. 3: Is a schematic representation of the device used for creep measurements. The illustrations (1) and (2) represent an instance of the yarn length (200) at the beginning of the experiment and an instance of the elongated yarn after a certain time t, respectively.

Figure 4:
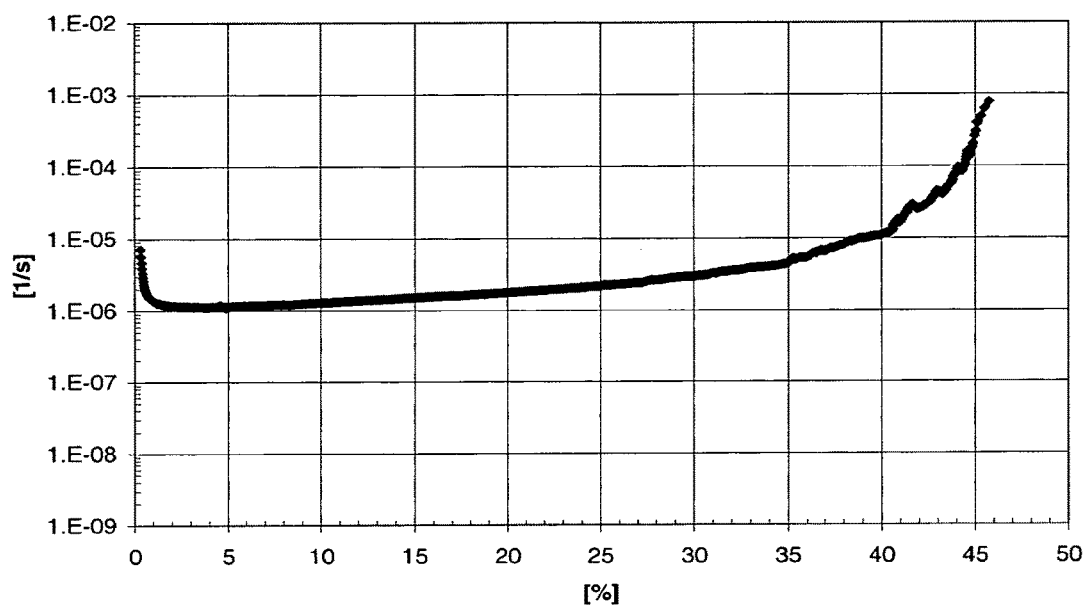

FIG. 4: Shows a plot of the creep rate [1/s] on a logarithmic scale vs. the elongation in percentage [%] characteristic to the yarn of the Comparative Experiment.

Figure 5:
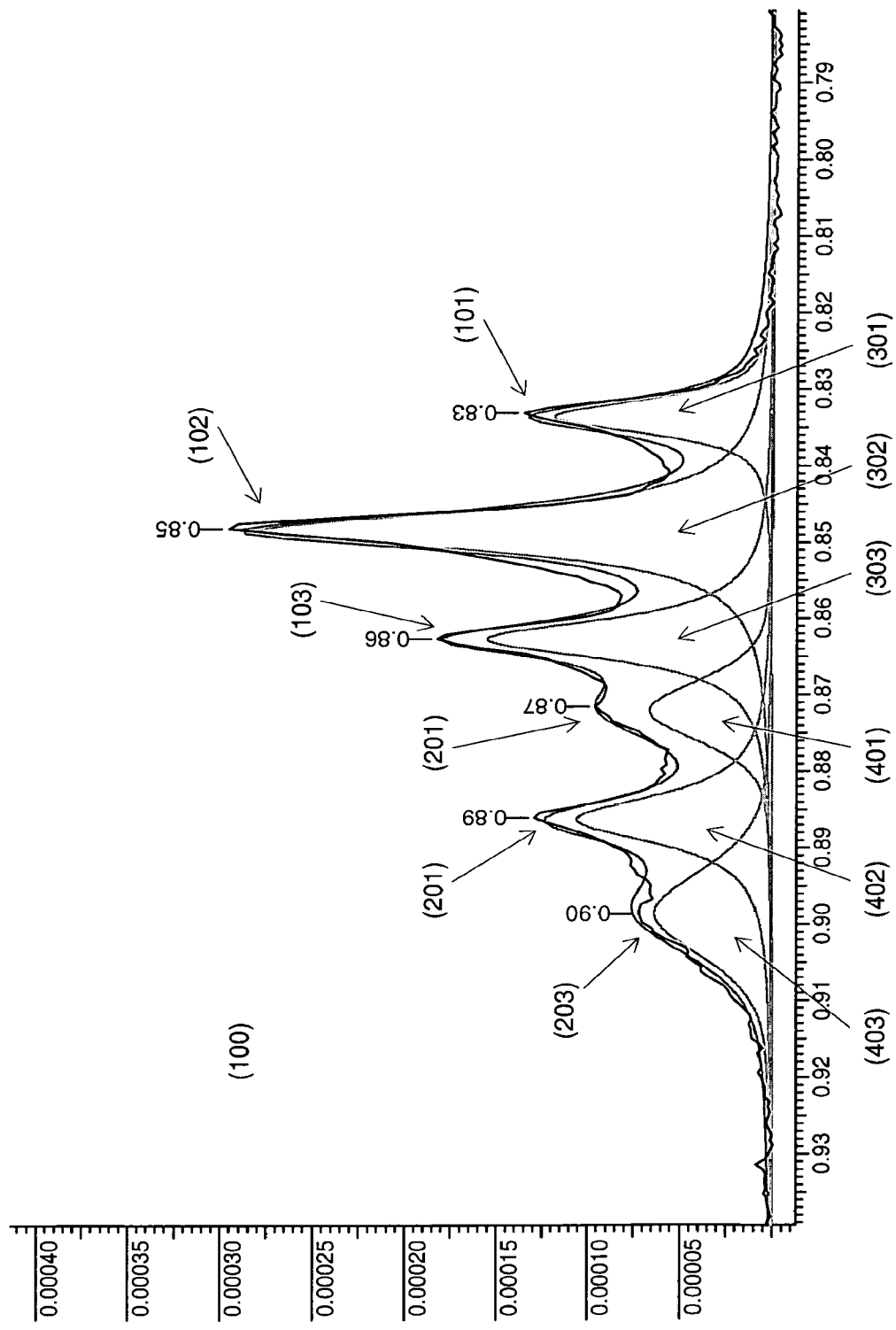

FIG. 5: Shows the NMR spectrum of the UHMWPE (grade GUR 4170 from Ticona) used in the process to produce the fiber of Example 1.

The invention will be further explained by the following examples and comparative experiment.

Methods:

IV: the Intrinsic Viscosity is determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration;

Dtex: fibers' titer (dtex) was measured by weighing 100 meters of fiber. The dtex of the fiber was calculated by dividing the weight in milligrams to 10;

Tensile Properties: tensile strength (or strength) and tensile modulus (or modulus) are defined and determined on multifilament yarns as specified in ASTM D885M, using a nominal gauge length of the fibre of 500 mm, a crosshead speed of 50%/min and Instron 2714 clamps, of type "Fibre Grip D5618C". On the basis of the measured stress-strain curve the modulus is determined as the gradient between 0.3 and 1% strain. For calculation of the modulus and strength, the tensile forces measured are divided by the titre, as determined by weighing 10 metres of fibre; values in GPa are calculated assuming a density of 0.97 g/cm$^3$.

Side chains: The amounts of methyl groups corresponding to ethyl side groups, and of methyl end groups contained by the UHMWPE were determined by proton $^1$H liquid-NMR, hereafter for simplicity 1-NMR, as follows:

a) 3-5 mg of UHMWPE were added to a 800 mg 1,1',2,2'-tetracholoroethane-d$_2$ (TCE) solution containing 0.04 mg 2,6-di-tert-butyl-paracresol (DBPC) per gram TCE. The purity of TCE was >99.5% and of DBPC >99%.

b) The UHMWPE solution was placed in a standard 5 mm NMR tube which was then heated in an oven at a temperature between 140°-150° C. while agitating until the UHMWPE was dissolved.

c) The NMR spectrum was recorded at 130° C. with a high field 400 MHz) NMR spectrometer using an 5 mm inverse Probehead and set up as follows: a sample spinrate of between 10-15 Hz, the observed nucleus—$^1$H, the lock nucleus—$^2$H, a pulse angle of 90°, a relaxation delay of 30 sec, the number of scans was set to 1000, a sweep width of 20 ppm, a digital resolution for the NMR spectrum of lower than 0.5, a total number of points in the acquired spectrum of 64k and a line broadening of 0.3 Hz. FIG. 5 shows the NMR spectrum of the UHMWPE of Example 1 d) The recorded signal intensity (arbitrary units) vs. the chemical shift (ppm), hereafter spectrum 1, was calibrated by setting the peak corresponding to TCE at 5.91 ppm (not shown in FIG. 5). The TCE peak can be distinguished easily, said peak being the highest in the ppm range between 5.5 and 6.5 in said spectrum 1.

e) Under identical sample preparation and experimental conditions as described in a)-d), the spectrum, hereinafter spectrum 2 (not shown), of an LLDPE (LLDPE 0026BP14 from Sabic) containing only ethyl branches and end groups was recorded.

f) The positions of the three peaks, i.e. a triplet, corresponding to methyl groups of the ethyl side groups were determined from spectrum 2, the three peaks being the highest in the ppm range of the spectrum between 0.8 and 0.9. Said peak positions were determined at about 0.83, about 0.85 and about 0.86, respectively.

g) The three peaks corresponding to methyl groups of the ethyl side groups in spectrum 1 were identified as the peaks at the positions determined in f) using spectrum 2. In FIG. 5, said peaks are (101), (102) and (103).

h) All the other peaks in the ppm range between 0.8 and 0.9 were considered as corresponding to methyl end groups. In FIG. 5 these are (201), (202) and (203).

i) The deconvolution of the peaks was performed using a standard ACD software produced by ACD/Labs;

j) The accurate determination of the areas ($A_1^{ethyl\ side\ groups}$, hereafter $A_1$ and $A_2^{LCB+end\ groups}$, hereafter $A_2$) of the deconvoluted peaks corresponding to methyl groups of the ethyl side groups and to the methyl end groups was performed with the same software. Herein, $$A_1 = \sum_{i=1}^{3} A_i,$$

wherein $A_i$ are the areas of the three peaks determined in g) and $$A_2 = \sum_{j=1}^{n} A_j,$$

wherein n is me total number of the peaks with area $A_j$ that are different than the peaks corresponding to methyl groups of the ethyl side groups. In FIG. 5, $A_i$ are (30i) where i is from 1 to 3 and $A_j$ are (40j) where j is from 1 to 3.

k) The amounts of methyl groups of the ethyl side groups and methyl end groups per thousand carbon atoms were computed as follows:

$$\text{methyl groups of the ethyl side groups} = 2 \times \frac{1000 \times \frac{A_1}{3}}{A_1 + A_2 + A_3};$$

$$\text{methyl end groups} = 2 \times \frac{1000 \times \frac{A_2}{3}}{A_1 + A_2 + A_3}$$

wherein $A_3$ is the area of the peak given by the $CH_2$ groups of the main UHMWPE chain, being the highest peak in the entire spectrum 1 and located in the ppm range of between 1.2 and 1.4 (not shown in FIG. 5).

Δδ Measurements

A 10 wt % suspension of UHMwPE powder in paraffin oil (Shell Ondina 68) and stabilizer (DBPC, 2 g/l) was preheated at a temperature of 60° C. 15 grams of the preheated suspension was mixed for 5 minutes in a midi-extruder (Xplore 15 ml Micro-Compounder with standard screw set) at a temperature of 210° C., the screws rotating at a speed of 60 rpm. The mixing was performed under nitrogen.

The obtained UHMWPE solution was pressed for 10 minutes at 150° C. into a square plate of 7.3 grams, with dimensions of 110×55 mm and a thickness of 1.6 mm. The plate was subsequently allowed to cool in open air. From the plate, a disc sample was cut having a diameter of 25 mm.

Frequency sweep dynamic rheological measurements were performed in shear at 150° C. on an ARES (TA Instruments) rheometer with parallel plate geometries of 25 mm diameter. The measurements were carried out in a strain controlled mode, i.e. strain is applied on the sample. The rheometer was equipped with a plate system provided with a liquid-lock filled with paraffin oil (FIG. 1), a high resolution actuator and a 2000 grams torque (force rebalance) transducer.

Before the start of the rheological measurements the rheometer's oven was preheated to 100° C. with a flow of nitrogen gas (forced convection oven). The disc sample was loaded at 100° C., after which the plate-plate distance was reduced to about 7-8 mm. The oven temperature was subsequently set to 150° C. and the oven was allowed to equilibrate. After about 5 minutes ensuing the equilibration of the oven, the plate-plate distance was reduced to 2.6 mm. After 1 minute the distance was reduced again to 2 mm. Subsequently, the distance was reduced again in steps of 0.1 mm/minute until a plate-plate distance of 1.6 mm was achieved.

The measurements started with a time sweep experiment performed for 5 hours with a strain amplitude of 2% and a frequency of 0.1 rad/s. The time sweep experiment was intended to release the sample from the residual stresses built during the initial sample preparation.

Immediately after ending the time sweep experiment, the frequency sweep experiment was started. The following settings for the rheometer were used:
The frequency interval of the frequency sweep was between 100 rad/s and 0.001 rad/s with 3 equally spaced frequencies per decade and decreasing frequency;
Temperature 150° C.;
Initial strain amplitude ($\gamma_o$) 1% of the plate-plate distance;
Auto strain mode set ON, allowing a maximum torque of 100 g*cm, a minimum torque of 0.5 g*cm with a strain adjustment of 90% of current strain. Maximum allowed strain amplitude was 10% of the plate-plate distance;
Auto tension mode was set on OFF.

The time and frequency sweep experiments are standard measurements being described in the ARES rheometer's operating manual.

The phase angle $\delta$ characteristic to the UHMWPE at a particular angular frequency $\omega$ was derived according to the theoretical description detailed in "*Rheology; Principles, Measurements and Applications*", 1994, VCH Publishers, Inc., ISBN 1-56081-579-5, at pages 121-123, formulas 3.3.15 to 3.3.18 included as reference herein. The variation of the phase angle $\delta$ [°] characteristic to UHMWPE grade GUR 4170 (sold by Ticona) within the frequency $\omega$ [rad/s] range between 0.001 rad/s and 100 rad/s is shown in FIG. 2.

Creep Measurements

Creep tests were performed with a device as schematically represented in FIG. 3, on untwined yarn samples, i.e. yarn with substantially parallel filaments, of about 1500 mm length, having a titer of about 504 dtex and consisting of 64 filaments.

The yarn samples were slip-free clamped between two clamps (101) and (102) by winding each of the yarn's ends several times around the axes of the clamps and then knotting the free ends of the yarn to the yarn's body. The final length of the yarn between the clamps (200) was about 180 mm.

The clamped yarn sample was placed in a temperature-controlled chamber (500) at a temperature of 70° C. by attaching one of the clamps to the sealing of the chamber (501) and the other clamp to a counterweight (300) of 3162 g resulting in a load of 600 MPa on the yarn. The position of the clamp (101) and that of clamp (102) can be read on the scale (600) marked off in centimeters and with subdivisions in mm with the help of the indicators (1011) and (1021).

Special care was taken when placing the yarn inside said chamber to ensure that the segment of the yarn between the clamps does not touch any components of the device, so that the experiment can run fully friction free.

An elevator (400) underneath the counterweight was used to raise the counterweight to an initial position whereat no slackening of the yarn occurs and no initial load is applied to the yarn. The initial position of the counterweight is the position wherein the length of the yarn (200) equals the distance between (101) and (102) as measured on (600).

The yarn was subsequently preloaded with the full load of 600 MPa during 10 seconds by lowering the elevator, after which the load was removed by raising again the elevator to the initial position. The yarn was subsequently allowed to relax for a period of 10 times the preloading time, i.e. 100 seconds.

After the preloading sequence, the full load was applied again. The elongation of the yarn in time was followed on the scale (600) by reading the position of the indicator (1021). The time needed for said indicator to advance 1 mm was recorded for each elongation of 1 mm until the yarn broke.

The elongation of the yarn $\varepsilon_1$ [in mm] at a certain time t is herein understood the difference between the length of the yarn between the clamps at that time t, i.e. L(t), and the initial length (200) of the yarn $L_0$ between the clamps. Therefore:

$$\varepsilon_i(t)[\text{in mm}] = L(t) - L_0$$

The elongation of the yarn [in percentages] is:

$$\varepsilon_i(t)[\text{in \%}] = \frac{L(t) - L_0}{L_0} \times 100$$

The creep rate [in 1/s] is defined as the change in yarn's length per time step and was determined according to Formula (2) as:

$$\dot{\varepsilon}_i = \frac{\varepsilon_i - \varepsilon_{i-1}}{t_i - t_{i-1}} \times \frac{1}{100} \quad (2)$$

wherein $\varepsilon_i$ and $\varepsilon_{i-1}$ are the elongations [in %] at moment i and at the previous moment i−1; and t, and $t_{i-1}$ are the time (in seconds) needed for the yarn to reach the elongations $\varepsilon_i$ and $\varepsilon_{i-1}$, respectively. The creep rate [1/s] was then plotted on a logarithmic scale vs. the elongation in percentage [%] as for example shown in FIG. 4 for the yarn of the Comparative Experiment. The minimum of the curve in FIG. 4 was then used as the creep rate value characteristic to the investigated yarn.

COMPARATIVE EXAMPLE 1

A 5 mass-% solution of a UHMWPE in decalin was made, said UHMWPE having an IV of 21 dl/g as measured on solutions in decalin at 135° C. The UHMWPE had a $\Delta\delta$ of 46° for $\delta_{100}$ of 14°.

The UHMWPE solution was extruded with a 25 mm twin screw extruder equipped with a gear-pump at a temperature setting of 180° C. through a spinneret having a number n of 390 spinholes into an air atmosphere containing also decalin and water vapors with a rate of about 1.5 g/min per hole.

The spinholes had a circular cross-section and consisted of a gradual decrease in the initial diameter from 3.5 mm to 1 mm with a cone angle of 60° followed by a section of constant diameter with L/D of 10, this specific geometry of the spinholes introducing a draw ratio in the spinneret $DR_{sp}$ of 12.25.

From the spinneret the fluid fibres entered an air gap of 25 mm and into a water bath, where the fluid fibres were taken-up at such rate that a total draw ratio of the fluid UHMWPE filaments $DR_{fluid}$ of 277 was achieved.

The fluid fibres were cooled in the water bath to form gel fibres, the water bath being kept at about 40° C. and wherein a water flow was being provided with a flow rate of about 50 liters/hour perpendicular to the fibres entering the bath. From the water bath, the gel fibres were taken-up into an oven at a temperature of 90° C. wherein solvent evaporation occurred to form solid fibres.

The solid fibres were drawn in the oven by applying a draw ratio of about 26.8, during which process most of the decalin evaporated.

The total stretch ratio $DR_{overall}$ (=$DR_{fluid} \times DR_{gel} \times DR_{solid}$) amounted 277×1×26.8=7424.

EXAMPLE 1

The Comparative Experiment was repeated with an UHMWPE (GUR 4170 from Ticona) having an IV of about 34 dl/g and a $\Delta\delta$ of 38° for $\delta_{100}$ of 14°.

EXAMPLE 2

Example 1 was repeated with a fluid draw ratio of 345 and a draw ratio applied to the solid fibres of 26. The same geometry of the spinneret as in the Comparative Example was used.

EXAMPLE 3

Example 1 was repeated with a fluid draw ratio of 350 and a draw ratio applied to the solid fibres of 33. The same geometry of the spinneret as in the Comparative Example was used.

EXAMPLE 4

Example 1 was repeated with a fluid draw ratio of 544 and a draw ratio applied to the solid fibres of 36. The spinneret contained spinholes having a gradual decrease in the initial diameter from 3.5 mm to 0.8 mm with a cone angle of 60° followed by a section of constant diameter with L/D of 10, this specific geometry of the spinholes introducing a draw ratio in the spinneret $DR_{sp}$ of 19.1.

EXAMPLE 5

Example 4 was repeated with a fluid draw ratio of 615 and a draw ratio applied to the solid fibres of 32.

EXAMPLE 6

Example 4 was repeated with a fluid draw ratio of 753 and a draw ratio applied to the solid fibres of 32.

The fibres' properties of the Comparative Example and of the Examples, i.e. creep rate, tensile strength, and modulus are summarized in Table 2. From said table it can be seen that by increasing the $DR_{overall}$ fibers with better mechanical properties in terms of strength and creep can be produced. Said table further shows that by using the same processing parameters but the UHMWPE according to the invention, fibers with improved mechanical properties are obtained as compared with fibers made from known polyethylenes.

TABLE 1

| | Fibres of the cited documents (reported units) | | | | UHMWPE fibres of Example 1 (transformed units) | |
|---|---|---|---|---|---|---|
| | Measurement conditions | | | Tensile | | Tensile |
| Document | Temperature ° C. | Load | Creep value | strength GPa | Creep value | strength GPa |
| EP 1,699,954 | 70° C. | 600 MPa | $0.91 \times 10^{-6}$ 1/s | 4.1 | $4.1 \times 10^{-7}$ 1/s | 4.3 |
| EP 0,205,960 | 71.1° C. | 2758.3 kg/cm² = 270.6 MPa | 0.08%/hour | <3.4 | 0.0018%/hour | |
| EP 0,269,151 | 50° C. | 600 MPa | $5 \times 10^{-8}$ 1/s | 2.7 | $2 \times 10^{-8}$ 1/s | |
| JP 5-70274 | 50° C. | 770 MPa | $1.1 \times 10^{-8}$ 1/s | 3.7 | $7 \times 10^{-8}$ 1/s | |
| U.S. Pat. No. 5,115,067 | 70° C. | 30% of 2.18 GPa = 654 MPa | $9.5 \times 10^{-6}$ 1/s | 2.18 | $4 \times 10^{-7}$ 1/s | |
| U.S. Pat. No. 5,246,657 | 70° C. | 30% of 3.1 GPa = 930 MPa | $2.89 \times 10^{-5}$ 1/s | 3.1 | $2 \times 10^{-6}$ 1/s | |

TABLE 2

| | n | $DR_{sp}$ | $DR_{ag}$ | $DR_{fluid}$ | $DR_{solid}$ | $DR_{overall}$ | TS (GPa) | Modulus (GPa) | Creep-rate $\times 10^{-7}$ (sec$^{-1}$) |
|---|---|---|---|---|---|---|---|---|---|
| Comp. Ex. | 390 | 12.25 | 22.6 | 277 | 26.8 | 7424 | 4.1 | 160 | 9.1 |
| Ex 1 | 390 | 12.25 | 22.6 | 277 | 26.8 | 7424 | 4.35 | 172 | 4.1 |
| Ex 2 | 390 | 12.25 | 28.2 | 345 | 26 | 8970 | 4.5 | 175 | 2.1 |
| Ex 3 | 390 | 12.25 | 28.5 | 350 | 33 | 11550 | 4.85 | 189 | 0.8 |
| Ex 4 | 390 | 19.1 | 28.5 | 544 | 36 | 19584 | 5.1 | 205 | 0.56 |
| Ex 5 | 390 | 19.1 | 29.6 | 615 | 32 | 19680 | 5.3 | 208 | 0.13 |
| Ex 6 | 390 | 19.1 | 39.4 | 753 | 32 | 24096 | 5.35 | 208 | 0.091 |

The invention claimed is:

1. A process for producing gel-spun UHMWPE fibres having high tenacities and improved creep resistance, the process comprising the steps of:
   (a) preparing a solution of an UHMWPE in a solvent, said UHMWPE having an intrinsic viscosity in decalin at 135° C. of at least 5 dl/g;
   (b) spinning the solution of step a) through a spinneret containing multiple spinholes into an air gap to form fluid filaments;
   (c) cooling the fluid filaments to form solvent-containing gel filaments; and
   (d) removing at least partly the remaining solvent from the gel filaments to form solid filaments before or during drawing the solid filaments; wherein
   the UHMWPE possesses a difference in the phase angle of at most 42° according to Formula 1

$$\Delta\delta = \delta_{0.001} - \delta_{100} \quad (1)$$

where,
   $\delta_{0.001}$ is the phase angle at an angular frequency of 0.001 rad/sec; and
   $\delta_{100}$ is the phase angle at an angular frequency of 100 rad/sec
   as measured with a frequency sweep dynamic rheological technique at 150° C. on a 10% solution of UHMWPE in paraffin oil, provided that $\delta_{100}$ is at most 18°.

2. The process of claim 1, wherein the UHMWPE possesses a difference $\Delta\delta$ of at most 40° provided that $\delta_{100}$ is at most 18°.

3. The process of claim 1, wherein the process comprises drawing the gel-spun fibres such that an overall draw ratio ($DR_{overall}$) is at least 5000 as determined by the formula:

$$DR_{overall} = DR_{fluid} \times DR_{gel} \times DR_{solid}, \text{ where}$$

$DR_{fluid}$ is a draw ratio of the fluid filaments;
   $DR_{gel}$ is a draw ratio of the solvent-containing gel filaments; and
   $DR_{solid}$ is a draw ratio of the solid filaments.

4. The process of claim 3, wherein $DR_{fluid}$ is at least 100, wherein $DR_{fluid} = DR_{sp} \times DR_{ag}$, where $DR_{sp}$ is a draw ratio of the fluid filaments in the spinholes of the spinneret and $DR_{ag}$ is a draw ratio of the fluid filaments in the air gap.

5. The process of claim 1, wherein the solid filaments are drawn in at least one step with a draw ratio of the solid filaments ($DR_{solid}$) being at least 4.

6. The process of claim 1, wherein the fluid filaments are drawn at a draw ratio $DR_{fluid}$ of at least 100, wherein $DR_{fluid} = DR_{sp} \times DR_{ag}$, where $DR_{sp}$ is a draw ratio of the fluid filaments in the spinholes of the spinneret and $DR_{ag}$ is a draw ratio of the fluid filaments in the air gap.

* * * * *